UNITED STATES PATENT OFFICE.

EDWIN WHITEFIELD, OF BUFFALO, NEW YORK.

IMPROVED PRINTING-FLUID.

Specification forming part of Letters Patent No. 48,471, dated June 27, 1865.

*To all whom it may concern:*

Be it known that I, EDWIN WHITEFIELD, of the city of Buffalo, county of Erie, and State of New York, have invented a new and Improved Printing-Fluid; and I do hereby declare that the following is a full and exact description thereof, reference being had to the accompanying sample and specimens of ingredients.

The nature of my invention consists in so combining certain acids with other ingredients so as to form an indelible fluid, by which cotton and linen fabrics, also other goods, may be beautifully and cheaply ornamented, thereby saving the expense of embroidering and braiding, also other expensive modes of ornamenting fabrics.

My invention is peculiarly adapted to ornamenting children's and ladies' garments, slippers, pin-cushions, and various other articles.

To enable others skilled in the art to make and use my invention, I will proceed to describe the mode of manufacture and the method of using.

To one pound of nitric acid mix two ounces of sulphuric-acid, one-fourth of a pound of logwood, and one-fourth of a pound of Chinese blue. Then take of iron filings and mix as much of them as the acids will dissolve, which perfectly saturates the acids thus mixed with the iron filings. While the filings are undergoing the action of the acids—say two or three days—I put the logwood into an iron vessel and pour boiling water to the logwood sufficient for a strong decoction, which remains until the acids have had sufficient action on the filings, which is then mixed with the acids thus treated.

The object of saturating the acids with the iron-filings is to neutralize the action of the acids upon the cloth or fabrics used.

The manner in which I use my improved printing-fluid is as follows: I prepare stencil-plates of thin sheet-brass, or other suitable material of various designs and patterns, and with a suitable brush apply the fluid to whatever fabric may be desired.

Having thus described my invention, what I claim as new, and desire to secure by Letters Patent, is—

A printing-fluid composed and manufactured of the ingredients, and applied substantially as herein described.

EDWIN WHITEFIELD.

Witnesses:
ROBT. HENEAGE,
THOS. J. CONRY.